July 5, 1938.  J. O. SHEETS  2,122,673
HARVESTER-THRESHER UNIT
Filed Oct. 9, 1936    2 Sheets-Sheet 1

Inventor
J. O. Sheets

By Clarence A. O'Brien
Hyman Berman
Attorneys

July 5, 1938.  J. O. SHEETS  2,122,673
HARVESTER-THRESHER UNIT
Filed Oct. 9, 1936   2 Sheets-Sheet 2

Inventor
J. O. Sheets
By Clarence A. O'Brien
Hyman Berman
Attorneys

Patented July 5, 1938

2,122,673

UNITED STATES PATENT OFFICE 2,122,673

HARVESTER-THRESHER UNIT

Joseph O. Sheets, Chapman, Kans.

Application October 9, 1936, Serial No. 104,882

2 Claims. (Cl. 198—213)

This invention has reference to combined harvester-thresher machines, and especially to improvements in the feeding mechanisms thereof.

The invention is particularly applicable to harvester-thresher machines using a helical conveyor or auger for conveying the cut material from the sickle to the threshing cylinder and the objects of the improvements are to aid in regulating the evenness of the feeding system and to eliminate bunching of the grain and clogging of the threshing cylinder.

The above objects are obtained by the novel means and mechanisms hereinafter more fully described and pointed out with reference to the accompanying drawings, wherein.

Figure 1:
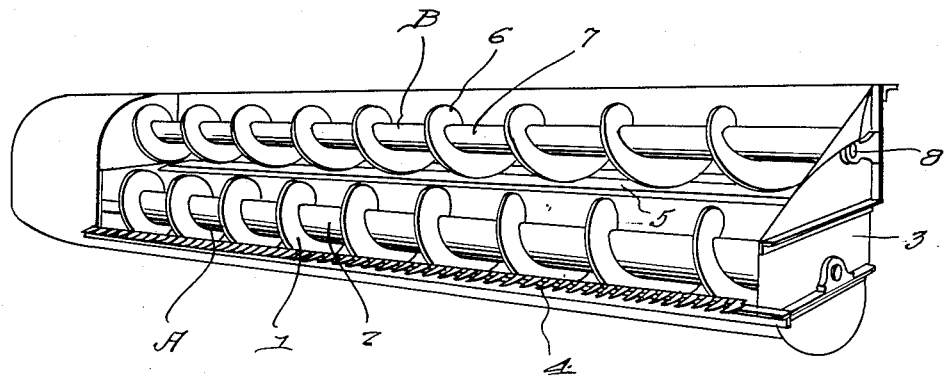
Figure 1 is a perspective view of a gleaner harvester unit with the invention applied thereto.

In the conventional gleaner harvester unit, the helical conveyor feeder or auger A is made of helical flighting 1 securely welded and riveted to a tube 2. It is mounted in the harvester pan feeding housing 3 and revolves on antifriction bearings for conveying cut grain from the sickle 4 to the threshing cylinder at the back of the conveyor feeder. A baffle plate 5 is mounted in the housing above the conveyor feeder to prevent grain from passing up and around the back of the conveyor.

It is the usual experience of operators of auger-type combines that there is constant irregular feeding and clogging in the cylinder in harvesting grain that is heavy or that does not stand up well in the field. Such grain, when cut by the sickle, tends to become bunched in the feed auger, resulting in an uneven feed and in the clogging of the threshing cylinder.

Figure 3:
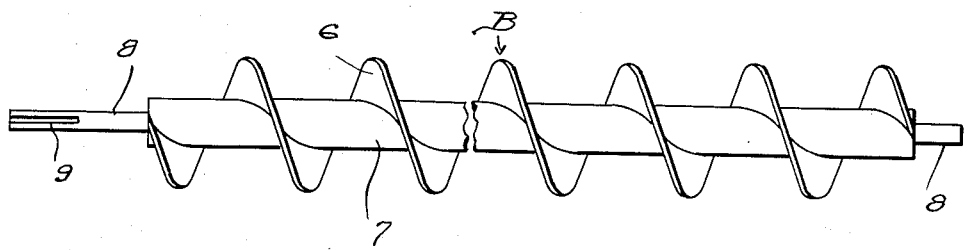
Figure 3 is a detail view in elevation of an accelerating helix or auger constituting the invention.
Figure 4:
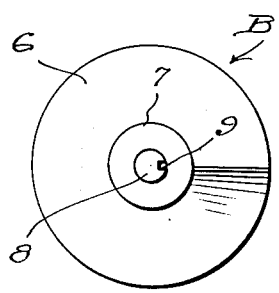
Figure 4 is an end view thereof.
Figure 2:
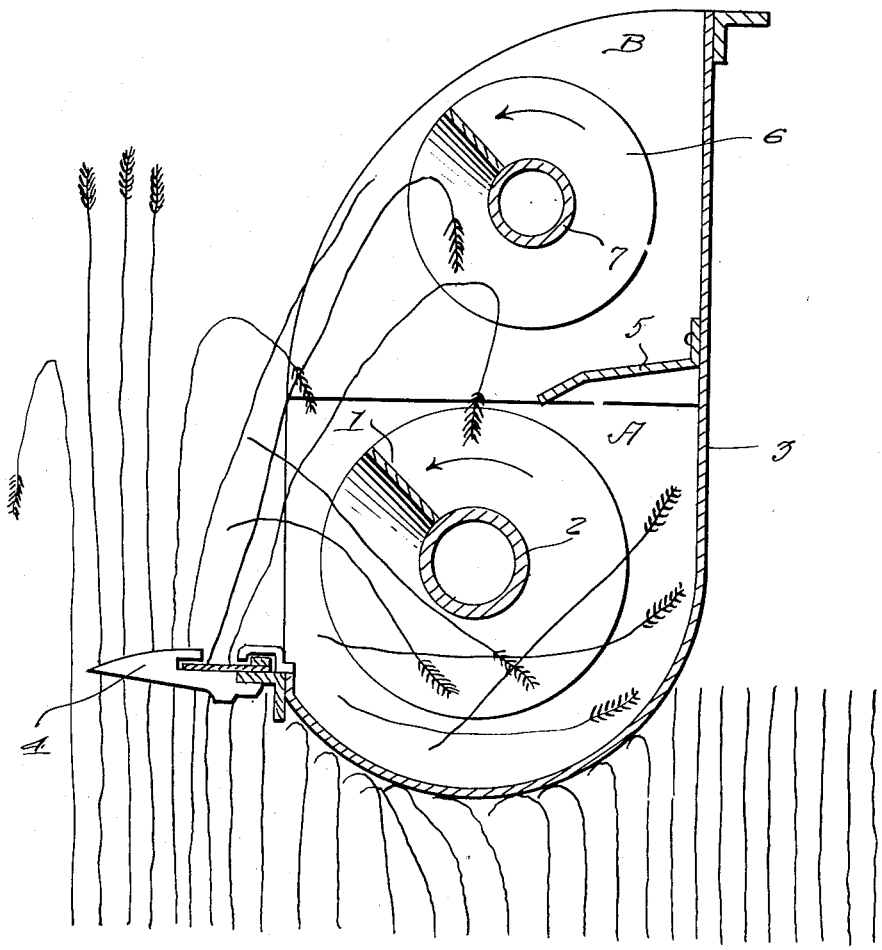
Figure 2 is a cross section of the gleaner harvester unit.

The present invention is directed to an improvement for eliminating the above-mentioned objectionable features of the auger feed system and to that end consists of a light auxiliary auger B to aid the main feed auger A for regulating and promoting a more direct and even feed of the grain to the threshing cylinder. Auger B in construction may be substantially similar to the main auger A, although on a smaller scale and, as shown in Figures 3 and 4, is made of helical flighting 6 having a supporting tube 7 provided at each end with a bearing journal 8, one of which is adapted, as at 9, to be coupled with the threshing cylinder and main auger drive mechanism. It is mounted as shown in Figure 2 above the baffle plate 5 and over the main auger A to be rotated mechanically in the same direction as the main auger. In operation, this auxiliary auger B catches cut grain which is too tall to be caught by the main auger and forces the long straws down into the main auger in a manner that eliminates bunching of the grain and results in a direct, even feed to the threshing cylinder. Clogging of the latter is thereby avoided, thus preventing wasted grain and insuring greater efficiency.

The device is simple in construction and operation, economic in design, and may be an attachment to or built in the harvester-thresher unit.

Having thus described the invention, what is claimed as new is:

1. The combination with a combined harvester-thresher unit including a pan and a helical conveyor in the pan, of an auxiliary helical conveyor mounted above and in parallelism with the conveyor and mechanically rotated for catching and forcing down into the lower conveyor cut material not caught by said lower conveyor, and a baffle plate for preventing cut material from rolling back up into the auxiliary auger.

2. A harvester thresher unit comprising a pan having a downwardly curved bottom and a substantially straight back with the top and front open, a helical conveyor in the lower part of the pan, a second helical conveyor in the top part of the pan for catching and forcing grain not caught by the main conveyor, downwardly into the main conveyor and a baffle member connected with the rear wall of the pan and extending forwardly between the two conveyors but terminating in rear of the longitudinal center of said conveyors.

JOSEPH O. SHEETS.